United States Patent
Kollreider

(12) 
(10) Patent No.: US 10,817,005 B2
(45) Date of Patent: Oct. 27, 2020

(54) ELECTRICALLY ADJUSTABLE TABLE SYSTEM

(71) Applicant: LOGICDATA Electronic & Software Entwicklungs GmbH, Deutschlandsberg (AT)

(72) Inventor: Daniel Kollreider, Graz (AT)

(73) Assignee: Logicdata Electronic & Software Entwicklungs GmbH, Deutschlandsberg (AT)

( * ) Notice: Subject to any disclaimer, the term of this patent is extended or adjusted under 35 U.S.C. 154(b) by 26 days.

(21) Appl. No.: 16/040,435

(22) Filed: Jul. 19, 2018

(65) Prior Publication Data

US 2019/0025860 A1 Jan. 24, 2019

(30) Foreign Application Priority Data

Jul. 20, 2017 (DE) .......................... 10 2017 116 400

(51) Int. Cl.
*G05D 19/02* (2006.01)
*A47B 9/04* (2006.01)
*A47B 21/02* (2006.01)

(52) U.S. Cl.
CPC .............. *G05D 19/02* (2013.01); *A47B 9/04* (2013.01); *A47B 21/02* (2013.01); *A47B 2009/046* (2013.01)

(58) Field of Classification Search
CPC ....... B25J 13/088; B25J 9/0009; G05D 19/02; G05D 1/0223; A47B 21/02; A47B 9/04
See application file for complete search history.

(56) References Cited

U.S. PATENT DOCUMENTS

| | | | | |
|---|---|---|---|---|
| 4,941,265 A * | 7/1990 | Heiland | ................. | G05B 19/18 33/1 M |
| 5,285,995 A * | 2/1994 | Gonzalez | ............... | G05D 19/02 248/550 |
| 5,765,800 A * | 6/1998 | Watanabe | ........... | F16F 15/0232 248/550 |
| 6,566,835 B1 * | 5/2003 | Yoshida | ............... | G05B 19/404 318/569 |
| 6,626,411 B2 * | 9/2003 | Houghton, Jr. | ......... | F16F 13/00 248/550 |
| 6,894,449 B2 * | 5/2005 | Nishi | .................. | F16F 15/0275 310/12.04 |
| 7,056,189 B2 * | 6/2006 | Yui | ........................ | B23Q 17/12 451/11 |
| 9,488,247 B2 * | 11/2016 | Rijnveld | ................. | F16F 15/02 |
| 9,546,945 B2 * | 1/2017 | Ryaboy | .................. | F16F 15/02 |
| 10,564,032 B2 * | 2/2020 | Fujita | .................... | G01H 17/00 |
| 2006/0086293 A1 * | 4/2006 | Ryaboy | .................. | F16F 15/03 108/161 |

(Continued)

*Primary Examiner* — Thai T Dinh
(74) *Attorney, Agent, or Firm* — Morgan, Lewis & Bockius LLP

(57) ABSTRACT

An electrically adjustable table system (1) has a table and at least one electric drive (4) for adjusting the table. The table system (1) further comprises at least one sensor (10) for detecting a vibration of the table and at least one actuator (12) arranged to transmit an oscillation to the table. In addition, the table system (1) has at least one controller (11) which is arranged to evaluate data acquired by the sensor (10) and to generate a compensation signal based on the acquired data, by which the actuator (12) is driven.

13 Claims, 2 Drawing Sheets

(56) References Cited

U.S. PATENT DOCUMENTS

Figure 1:
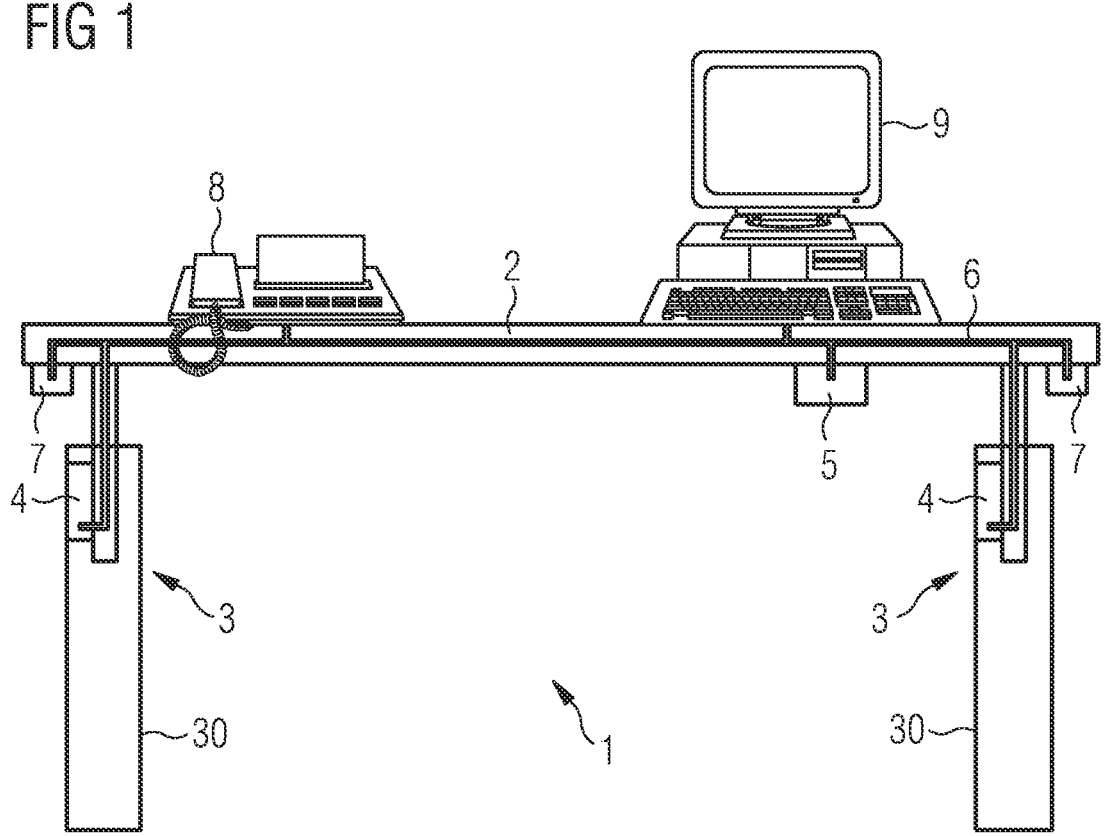

| | | | |
|---|---|---|---|
| 2009/0133609 A1* | 5/2009 | Nethken | A47B 21/03 108/50.02 |
| 2014/0096706 A1* | 4/2014 | Labrosse | F16L 3/01 108/21 |
| 2016/0309889 A1* | 10/2016 | Lin | A47B 9/00 |
| 2017/0135587 A1* | 5/2017 | Desroches | A61B 5/14551 |

* cited by examiner

ELECTRICALLY ADJUSTABLE TABLE SYSTEM

The present invention relates to an electrically adjustable table system comprising a table and at least one electric drive for adjusting the table.

An important sales argument of height-adjustable desks is the noise behaviour of the desk during adjustment. Height-adjustable desks are often used in open-plan offices. Especially in such offices, it is important that the desks can be adjusted as quietly as possible.

Electrically adjustable table systems are often driven by a DC motor. A gearbox with a spindle drive, connected behind the gearbox, translates the rotary movement of the motor into a linear movement. It is unavoidable that vibrations and thus noise is generated by the motor, gearbox and spindle.

Well-known electrically adjustable table systems differ considerably in operating noise. Noise optimisation in gearboxes is achieved by optimising the gearbox design and achieving small tolerances. An additional noise source is the DC motor. Conventional motors are very unstable and difficult to control regarding noise. Here, too, the noise can be positively influenced by high component quality. Both cases result in an unfavorable influence on product costs.

A typical solution for noise reduction is acoustic insulation with foam and other insulating materials. Frequently, however, especially for inline drives, there is not enough space available for noise insulation.

An object of the present invention is to describe an electrically adjustable table system that solves or reduces the problems mentioned above.

The above-mentioned object is solved by an electrically adjustable table system mentioned above. The electrically adjustable table system has at least one sensor for detecting a vibration of the table and at least one actuator which is arranged to transmit an oscillation to the table. Furthermore, the electrically adjustable table system has at least one controller which is arranged to evaluate data acquired by the sensor and to generate a compensation signal based on the acquired data, by which the actuator is driven.

Adjusting the table generates vibrations which, for example, transmitted to a table top, generate disturbing noise. An advantage of such electrically adjustable table system is that such disturbing noise is reduced. The vibrations generate disturbing noise when they stimulate a resonance body to vibrate at an audible frequency. For example the table top, a table frame or table legs may serve as resonance bodies for disturbing vibrations on a table. Stimulation of the oscillation of such resonance bodies is reduced or prevented by this invention, by transmitting a destructively interfering oscillation to the resonance body via the actuator, which dampens or eliminates the disturbing noise.

In at least one embodiment of the invention, a compensation signal is only sent to the actuator when the at least one electric drive for adjusting the table is active. An advantage of such embodiment is that the actuator does not spring into action with every random vibration of the table. A random vibration of the table may be generated, for example, by a user of the table bumping against the table or simply working on it. If, each time the table vibrates, a compensation signal is sent to the actuator so that it transmits an oscillation to the table, disturbing noise could be generated by the actuator itself if the actuator springs into action with slight vibrations that are not generated by adjusting the table.

In at least one embodiment of the invention, the at least one actuator is arranged at at least one of the following: at a table top of the table system, at least one leg of the table system, or at a table frame of the table system. An advantage of an arrangement on the table top is that the table top is usually a largest component of the electrically adjustable table system. This component thus represents the largest resonance body of the table. Thus, a large part of the disturbing noise is generated via the table top. By arranging the actuator at the table top, most of the disturbing noise is reduced. An arrangement at a table leg and/or the table frame means that the compensation is carried out at a location close to the origin of the vibrations.

In at least one embodiment of the invention, the electrically adjustable table system further comprises at least one control of the at least one electric drive. The controller has at least one interface via which the controller is connected to the at least one control of the at least one electric drive. An advantage of such embodiment is that a signal exchange between the controller and the at least one control of the at least one electric drive is made possible.

In at least one embodiment of the invention, one control of the at least one electric drive is arranged decentralized on each electric drive and one sensor, one controller and one actuator is arranged in each area of each of the electric drives. An advantage of such embodiment is that the vibrations, which cause disturbing noise, can be damped in the vicinity of their generation, even if the electrically adjustable table system has several electric drives.

In at least one embodiment of the invention, the actuator is further arranged to transmit signals from a telephone and/or a computer system as vibration signals to the table system. An advantage of such embodiment is that additional disturbing noise in an office, such as the ringing of a telephone, can be reduced. An incoming call, for example, can be signaled to a user of the electrically adjustable table system via such a vibration signal. This way, other employees are not or at least less disturbed. Such vibration signals may, for example, stimulate the table system only minimally in order to produce no disturbing noises.

In at least one embodiment of the invention, the actuator is further arranged to emit acoustic signals via the table system. An advantage of such embodiment is that, for example, additional loudspeakers may be dispensed with. Music, speech or other acoustic reproductions can be played via the table system itself.

Further advantageous embodiments are disclosed in the attached claims and the following descriptions of exemplary embodiments. The exemplary embodiments are described with reference to the attached figures. The same reference signs are used in the figures for elements with essentially the same function, but these elements do not have to be identical in all details.

Figure 2:
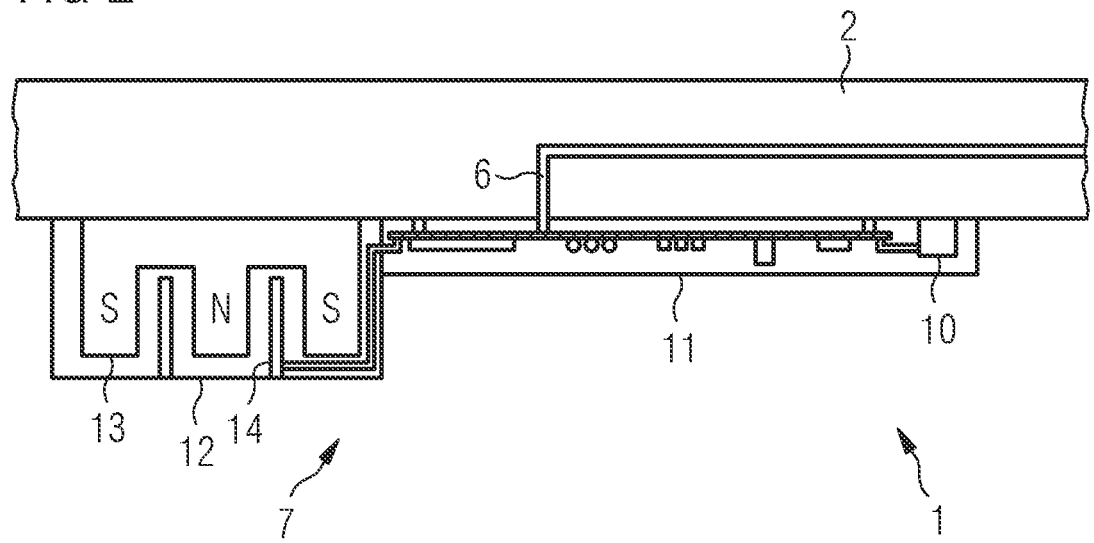
Figure 3:
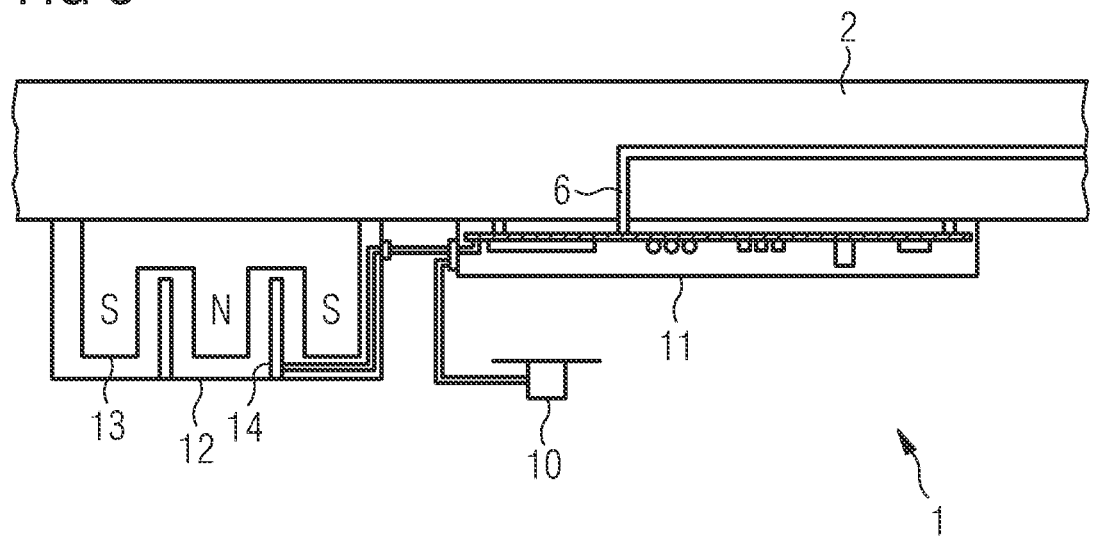

In the figures:

FIG. 1 shows a schematic drawing of an electrically adjustable table system according to an embodiment of the invention, FIG. 2 shows a schematic drawing of a part of an electrically adjustable table system with a damping device according to a first embodiment of the invention, and FIG. 3 shows a schematic drawing of a part of an electrically adjustable table system with a damping device according to a second embodiment of the invention.

FIG. 1 shows a schematic drawing of an electrically adjustable table system 1 according to an embodiment of the invention. The electrically adjustable table system 1 has a table top 2 and two height-adjustable table legs 3. The table legs 3 are each connected to the table top 2 on a bottom side of the table top 2 in opposite edge areas of the table top 2. Additionally or alternatively to a height adjustment of the table legs 3, the table top 2 can also be arranged to be tilted on the electrically adjustable table system 1.

Both table legs 3 each contain an electric drive 4 for adjusting the table system 1. The electric drives 4, for example, each comprise a motor, in particular a DC motor, whose rotary movement is converted into a linear movement by a gearbox with a spindle drive which is connected behind the gearbox. With this linear movement, the height of the table legs 3 is adjusted.

To control the electrically adjustable table system 1, an input device 5 is located on the bottom side of table top 2. The input device 5 can of course also be mounted at another suitable location. Alternatively, the input device 5 can also be a remote control that is not directly attached to the table system 1. However, legal regulations may have to be respected. Using this input device 5, a user of the electrically adjustable table system 1 can, for example, generate signals for extending or retracting the table legs 3. These signals are sent via signal lines 6 from the input device 5 to the electric drives 4. Signal lines 6, for example, represent a data bus system of the electrically adjustable table system 1. Via these signal lines 6, control signals are transmitted and a general supply voltage is provided, for example. Regulated drive voltages, for example, are generated at the electric drives 4 based on the control signals received. Direct supply with regulated drive voltages is also possible. Alternatively, the signals can be sent to the electric drives 4 via a wireless radio system. The signals each cause the motors in the electric drives 4 to move accordingly.

Vibrations are caused by the movement of the motors, gearboxes and/or spindle drives. Such vibrations can also be caused by the movement of the table legs 3 themselves, when the height of the table system 1 is adjusted. These vibrations stimulate components of table system 1 to vibrate, which causes disturbing noise. In particular table top 2, which is the largest component of the electrically adjustable table system 1, serves as a resonance body for the disturbing noise and amplifies it.

Two damping devices 7 are arranged on the bottom side of table top 2 to dampen the disturbing noise during an adjustment of the table system 1. Both damping devices 7 are each mounted to table top 2 in an area of table legs 3. Alternatively, the damping devices 7 can of course also be mounted at other positions of table top 2. Furthermore, only one damping device 7 or more than two damping devices 7 can be used for the electrically adjustable table system 1. In this exemplary embodiment, the damping devices 7 are mounted on the table top 2, as this is the largest resonance body. Alternatively or additionally, damping devices 7 can also be mounted, for example, on the table legs 3, where a large proportion of the vibrations arise. In the exemplary embodiment according to FIG. 1, table legs 3 each have a casing 30. This casing 30 can, for example, be made of metal. The electric drives 4 are mounted inside each of these casings 30. In the case where damping devices 7 are attached to the table legs 3, the damping devices 7 can be arranged, for example, on the outside or inside of casing 30.

The damping devices 7 sense vibrations of table top 2 and transmit oscillations to table top 2, which counteract the vibrations. Oscillations are generated by the damping devices 7, which dampen the vibrations of table top 2 by destructive interference. The damping devices 7 are described in more detail with reference to FIGS. 2 and 3.

The damping devices 7 are connected to the signal lines 6 in this exemplary embodiment. This way, the damping devices 7 can recognize the sending of a signal to the electric drives 4 for an adjustment of the table system 1. In this exemplary embodiment, the damping devices 7 only generate oscillations when the electric drives 4 are active. Alternatively, the damping devices 7 can of course also be connected to the control of the electrically adjustable table system 1 via additional signal lines or a wireless signaling system.

FIG. 1 further shows a telephone system 8 and a computer system 9, which are used by the user of the electrically adjustable table system 1 on the table. These systems 8, 9 are also connected to the signal lines 6. Alternatively, the systems 8, 9 can be connected to the damping devices 7 via additional signal lines. This embodiment makes it possible, independent of the damping of vibrations generated by an adjustment of the table system 1, to actively reproduce signals from systems 8, 9 via the damping devices 7. These can be, for example, haptic signals, such as a vibration of the table top 2. For example, an incoming call on the telephone system 8 or an incoming e-mail on the computer system 9 can be signaled to a user of the table system 1 via a short vibration signal. A multitude of different events, also from other devices, can be signaled to the user of the table system 1 with various vibration signals.

If the electric drives 4 and thus the vibration damping of the damping devices 7 is inactive, the damping devices 7 are in a stand-by state and are waiting for signals from the systems 8, 9. Furthermore, the oscillation generation of the damping devices 7 can also be used to emit acoustic signals via table top 2. This way it is possible, for example, to reproduce music or telephone calls from the computer system 9 or the telephone system 8 via table top 2.

Additionally, the damping devices 7 can be used to receive a signal input from the user of the electrically adjustable table system 1. By sensing vibrations on table top 2, for example, the damping devices 7 can detect significant knocking signals from the user of the table. If these significant knocking signals are detected, predetermined actions can be performed. For example, table system 1 can be adjusted in response to such a knocking signal or telephone calls can be accepted on the telephone system 8. A multitude of possible actions on the systems 8, 9, or other devices not shown here, which are connected to the damping devices 7 via signal lines 6, are of course possible. For this purpose, the damping device 7 detects the significant knocking signals and generates a control signal which is sent via the signal lines 6 to the input device 5, to the electric drives 4 directly or to the systems 8, 9.

FIG. 2 shows a schematic drawing of a part of an electrically adjustable table system 1 with a damping device 7 according to a first embodiment of the invention. FIG. 2 shows a section of table top 2. On a bottom side of table top 2 there is a damping device 7, which can be used, for example, for the electrically adjustable table system 1 according to FIG. 1.

The damping device 7 has a sensor 10, a controller 11 and an actuator 12. In this exemplary embodiment, sensor 10 is an acceleration sensor. For example, a piezo sensor can be used. Of course, all types of sensors that can sense vibrations can be used as sensor 10. Controller 11 is connected to sensor 10 and is arranged to receive and process signals from sensor 10. Furthermore, controller 11 is connected to a signal line 6. With regard to signal line 6, reference is made to the description of FIG. 1. Controller 11 is further electrically connected to actuator 12. In this exemplary embodiment, a structure-borne sound actuator serves as actuator 12.

Based on the signals received from sensor 10, controller 11 generates control signals. If, for example, controller 11 detects an activity of the electric drives of the electrically adjustable table system 1 via signal line 6 and sensor 10 signals to controller 11 a vibration of table top 2, then a compensation signal, by which actuator 12 is driven, is generated by controller 11.

Actuator 12 contains a permanent magnet 13 and an electrically conductive coil 14. The electrically conductive coil 14 is inserted into a recess of permanent magnet 13. Outside the coil 14, the permanent magnet 13 has south poles and inside the coil 14 a north pole. The compensation signal sent from controller 11 to actuator 12 is an alternating current conducted through the electrically conductive coil 14. In interaction with the magnetic field of the permanent magnet 13, the resulting electric field generates an oscillation of the coil 14. This oscillation of coil 14 is transmitted from actuator 12 to table top 2.

In order that the oscillation, generated by actuator 12, counteracts the vibrations of table top 2, the generated oscillation has to have an amplitude similar to the vibrations with a phase shift of approx. 180°. A corresponding calculation of the compensation signal, with which the oscillation is generated, is done by controller 11, based on the signal sent from sensor 10 to controller 11.

In addition, further signal processing steps can be performed by controller 11 when generating the compensation signal. This can include, for example, smoothing and/or amplification of the signal received from sensor 10. In addition, controller 11 can receive signals, such as a motor rotation speed, from electric drive 4 via signal line 6. These signals can also be taken into account when generating the compensation signal.

In FIG. 2, sensor 10 is mounted inside a housing of controller 11 on table top 2. FIG. 3 shows a schematic drawing of a part of an electrically adjustable table system 1 with a damping device 7 according to a second embodiment of the invention. The damping device 7 in FIG. 3 is largely similar to the damping device 7 according to FIG. 2, but, according to FIG. 3, sensor 10 is not mounted inside a housing of controller 11 on table top 2. According to FIG. 3, sensor 10 is mounted separately from controller 11 on table top 2. This way, sensor 10 can be mounted even closer to actuator 13 on table top 2. Alternatively, sensor 10 can be mounted, not on table top 2, but on a table leg 3, for example.

The possibilities described with reference to FIG. 1, regarding the reproduction of haptic and/or acoustic signals and/or the input of signals by a user of table system 1 via significant knocking signals, can be realized with the damping devices 7 according to the embodiments of FIGS. 2 and 3.

When the haptic and/or acoustic signals are reproduced, controller 11 receives a corresponding signal from one of the systems 8, 9 connected via signal line 6. The signal is processed by controller 11 and sent to actuator 12. Actuator 12 then generates corresponding oscillations which are transmitted to table top 2 to reproduce the haptic and/or acoustic signals.

When entering signals of the user via significant knocking signals, sensor 10 detects a corresponding significant knocking signal. This can be a knocking pattern similar to a Morse code, for example. Sensor 10 sends a corresponding detection of the vibration to controller 11. In this case, controller 11 detects that the electric drives 4 are not active and does not generate a compensation signal. Instead, controller 11 evaluates the received significant knocking signal. If the knocking signal is known to controller 11, for example from a previously performed registration and storage of different significant knocking signals in connection with actions assigned to the knocking signals, controller 11 generates a signal with an action request to systems 8, 9 and/or electric drives 4 to cause a corresponding action.

The exemplary embodiments of the damping devices described herein are described with reference to electrically adjustable table systems. Alternatively, however, such damping devices can equally be used for other pieces of furniture, for example electrically adjustable beds.

The invention claimed is:

1. An electrically adjustable table system, comprising:
    a table,
    at least one electric drive for adjusting the table,
    at least one sensor arranged to detect a vibration of the table caused by the at least one electric drive during adjustment of the table,
    at least one actuator arranged to transmit an oscillation to the table, wherein the actuator is a structure-borne sound actuator, and
    at least one controller arranged to evaluate data acquired by the sensor and to generate a compensation signal based on the acquired data, by which the actuator is driven.

2. The electrically adjustable table system according to claim 1, wherein the controller is arranged to only sends a compensation signal to the actuator while the electric drive for adjusting the table is active.

3. The electrically adjustable table system according to claim 1, wherein the at least one actuator is arranged on at least one of the following:
    on a table top of the table system,
    on at least one table leg of the table system, and
    on a table frame of the table system.

4. The electrically adjustable table system according to claim 1, further comprising at least one control of the at least one electric drive, the controller having at least one interface via which the controller is connected to the at least one control of the at least one electric drive.

5. The electrically adjustable table system according to claim 4, wherein each of the at least one electric drive comprises the at least one control of the at least one electric drive, and wherein the sensor, the controller and the actuator are each arranged in a region of each of the at least one electric drives.

6. The electrically adjustable table system according to claim 1, wherein the sensor is an acceleration sensor.

7. The electrically adjustable table system according to claim 1, wherein the actuator is further arranged to transmit notifications from a telephone system and/or a computer system to a user of the table system as vibration signals to the table system.

8. The electrically adjustable table system according to claim 7, wherein said actuator is further arranged to emit acoustic signals via the table system.

9. The electrically adjustable table system according to claim 7, wherein the controller is arranged to evaluate user input signals from vibration of the table detected by the sensor and, basing on the evaluated user input signals, to generate a control signal, when the electric drive for adjusting the table is inactive, wherein the generated control signal contains an action request to the telephone system and/or the computer system to cause a predetermined action.

10. The electrically adjustable table system according to claim 1, further comprising at least one table leg having a casing, wherein the at least one electric drive is arranged inside the casing and the at least one sensor and/or the at least one actuator is arranged on the casing.

11. The electrically adjustable table system according to claim 1, wherein the controller is arranged to receive operational signals of the at least one electric drive, wherein the operational signals include a motor rotation speed, and wherein the controller is configured to take into account these operational signals when generating the compensation signal.

12. The electrically adjustable table system according to claim 1, wherein the controller is arranged to evaluate user input signals from vibration of the table detected by the sensor and, basing on the evaluated user input signals, to generate a control signal, when the electric drive for adjusting the table is inactive, wherein the generated control signal contains an action request to the electric drive to cause a predetermined action.

13. The electrically adjustable table system, comprising:
a table,
at least one electric drive for adjusting the table,
at least one sensor configured for detecting a vibration of the table caused by a rotary movement of the at least one electric drive during adjustment of the table,
at least one actuator arranged to transmit an oscillation to the table, wherein the actuator is a structure-borne sound actuator, and
at least one controller arranged to evaluate data acquired by the sensor and to generate a compensation signal based on the acquired data, by which the actuator is driven, wherein the controller is arranged to only sends a compensation signal to the actuator while the rotary movement of the electric drive for adjusting the table is active.

* * * * *